United States Patent [19]

Frere et al.

[11] Patent Number: 5,537,872

[45] Date of Patent: Jul. 23, 1996

[54] ANGULAR RATE SENSOR

[75] Inventors: Peter E. M. Frere, Birmingham; Russell W. Craddock, Near Nuneaton, both of England

[73] Assignee: Lucas Industries public limited company, West Midlands, England

[21] Appl. No.: 71,732

[22] Filed: Jun. 3, 1993

[30]  Foreign Application Priority Data

Jun. 6, 1992 [GB] United Kingdom ............ 9212099

[51] Int. Cl.$^6$ ............................................ G01P 3/44
[52] U.S. Cl. ............................................ 73/504.12
[58] Field of Search ............... 73/505, 510, 517 AV, 73/504.12, 504.14, 504.15, 504.16

[56]  References Cited

U.S. PATENT DOCUMENTS

| 4,381,672 | 5/1983 | O'Connor et al. | 73/505 |
| 4,538,461 | 9/1985 | Juptner | 73/504.16 |
| 4,654,663 | 3/1987 | Alsenz et al. | 73/505 |
| 4,744,248 | 5/1988 | Stewart | 73/505 |
| 4,898,032 | 2/1990 | Voles | 73/505 |
| 5,025,346 | 6/1991 | Tang et al. | 73/517 AV |
| 5,285,686 | 2/1994 | Peters | 73/504.15 |

FOREIGN PATENT DOCUMENTS

| 2156523 | 10/1985 | United Kingdom . |
| 2198231 | 6/1988 | United Kingdom . |

Primary Examiner—Hezron E. Williams
Assistant Examiner—Christine K. Oda
Attorney, Agent, or Firm—Jenner & Block

[57]  ABSTRACT

An angular rate sensor comprises a wafer of silicon etched to form tines with teeth which are interdigitated. The tines are excited into oscillation in the plane of the wafer, by applying suitable drive signals to create electrostatic forces between the tines. Rotation of the tines out of the plane of the wafer is detected by a suitable detector, such as a piezo-resistor on a support of the tines.

13 Claims, 3 Drawing Sheets

ANGULAR RATE SENSOR

The present invention relates to an angular rate sensor and to a method of production thereof.

Gyroscopes can be used to provide an angular rate sensor. Such sensors find applications in aircraft guidance systems, such as "auto pilots". Gyroscopes are physically heavy and the bearings used to support the gyroscope may be damaged by shock or vibration.

Solid state angular rate sensors are known and have been described. Alsenz et al, U.S. Pat. No. 4,654,663, describe an angular rate sensor consisting of a tuning fork of piezo-electric material. The tines of the tuning fork are caused to vibrate by applying an alternating voltage to the piezo-electric material. Angular motion causes cyclic deflection of the tines normal to the driven vibration of the tines. The cyclic deflection is detected in a stem of the tuning fork.

O'Connor et al, U.S. Pat. No. 4,381,672, describe an angular rate sensor having a single cantilevered beam formed of crystalline silicon. The beam is planar and vibrated perpendicular to the plane of the beam.

GB 2 198 231A describes an angular rate sensor formed from crystalline silicon. A laminar body is supported by a filament under tension. The body oscillates about the axis of the filament. Rotation about a first axis perpendicular to the filament while the body oscillates causes a torque perpendicular to the filament and the first axis.

GB 2 156 523A discloses an angular rate sensor in which a planar member is driven in torsional oscillation about an axis co-planar with the member.

Juptner et al, U.S. Pat. No. 4,538,461, disclose an angular rate sensor comprising a tuning fork formed in a quartz wafer. The tines are driven by piezo-electric excitation. The masses of the tines have to be carefully balanced.

Tang et al, U.S. Pat. No. 5,025,346, discloses a poly silicon microbridge structure driven parallel to the substrate. In one embodiment a vibrating element is centrally disposed between two electrodes. The electrodes couple capacitively to the vibrating element via interdigitated structures formed as parts of the electrodes and vibrating element, respectively. A disadvantage of this arrangement is that, as the oscillating elements twist, coupling of drive is reduced because of loss of alignment. This leads to reduced sensitivity of the sensor.

According to a first aspect of the present invention there is provided an angular rate sensor, comprising a wafer of silicon etched to define first and second interdigitated tines, means for exciting the first and second tines into oscillation co-planar with the wafer and in anti-phase with one-another, and detecting means for detecting rotation of the tines out of the plane of the wafer.

Preferably the silicon is monocrystalline silicon.

Preferably the tines are excited electrostatically.

The tines may be fixed at a first end and free at a second end. The tines may be supported by a first torsion support formed at the first end of the tines and parallel to the tines. Preferably the first torsion support is formed equidistant from the first and second tines. Alternatively the tines may be fixed at the first and second ends. A second torsion support, in addition to the first torsion support, may be formed at the second end of the tines and be co-axial with the first torsion support. As a further alternative, the tines may be supported by a first flexure support formed at the first end of the tines, perpendicular to the tines and co-planar with the wafer. Further flexure supports may be provided. Preferably the or each flexure support may flex out of the plane of the wafer.

The detecting means may comprise a piezo-resistor or a capacitive sensor.

Preferably conducting paths are formed on the tines and the digits thereof so that drive signals may be applied to the tines to excite them electrostatically into vibration.

The detecting means may be attached to a or the support. The detecting means may be formed on the first torsion stem for measuring torsional deformation of the stem. Alternatively the detecting means may be formed on the first flexure support for detecting flexure perpendicular to the plane of the wafer.

Further detecting means may be formed on further torsion or flexure supports.

Preferably the wafer is bonded to a further wafer. The bonding may be silicon fusion bonding. The further wafer has depressions formed in a first surface corresponding to regions adjacent the tines and supports formed in the wafer. Preferably the wafer is approximately 10 micrometers thick. The further wafer acts as a platform for the wafer.

Preferably the wafer is doped with a first dopant. Additionally the further wafer may be doped with a second dopant.

Preferably an angular rate sensor having a torsion support has the or each torsion support formed parallel to a <100> crystallographic plane. Preferably an angular rate sensor having flexure support has the or each flexure support formed parallel to a <110> crystallographic plane.

According to a second aspect of the invention there is provided a method of making a sensor according to the first aspect of the invention, comprising the steps of:

forming on a first wafer lightly doped with a first dopant a thin epitaxial layer doped with a second dopant;

forming depressions corresponding to the sensor geometry in a second wafer;

bonding the second wafer to the epitaxial layer with the depressions facing the epitaxial layer;

etching the first wafer so as to expose the epitaxial layer; and forming the sensor structure in the epitaxial layer.

Preferably the sensor structure is defined in the epitaxial layer by a combination of photolithography and etching.

Preferably a diffusion of a third dopant is made into a region of the epitaxial layer that will be etched to form the interdigitated tines so as to provide conduction paths for driving the tines.

The angular rate sensor can be made with few moving parts. The sensor can be manufactured using production techniques established for the manufacture of integrated circuits, thereby allowing robust, high quality sensors to be manufactured relatively inexpensively.

The present invention will further be described, by way of example, with reference to the accompanying drawings, in which.

Figure 1:
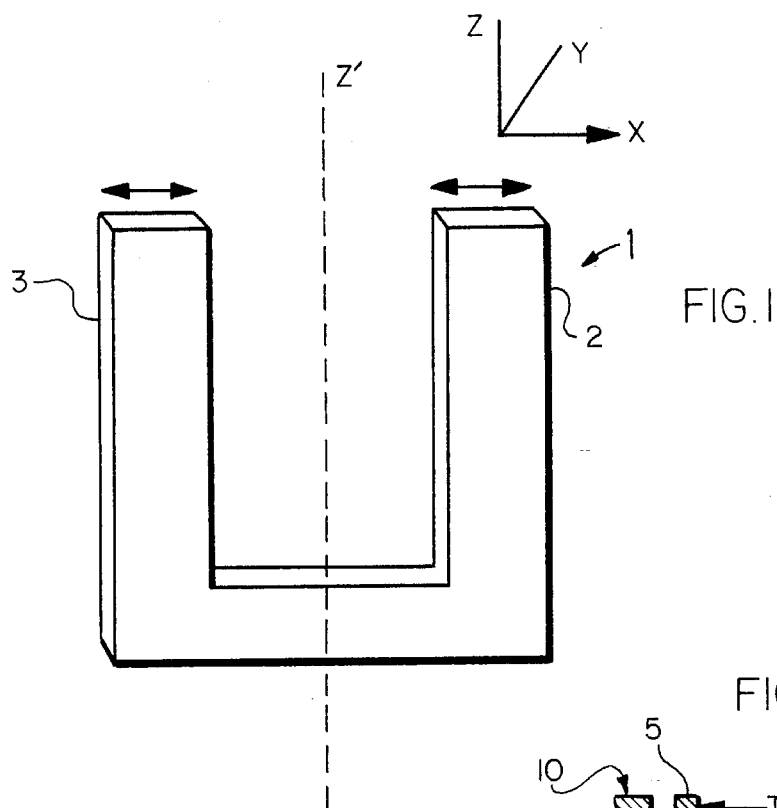
FIG. 1 is a schematic diagram of a tuning fork.

FIG. 1 schematically illustrates a tuning fork 1. The tuning fork 1 has first and second tines 2 and 3 spaced apart in the X axis of a co-ordinate system X,Y,Z fixed with respect to the tuning fork 1. The tines vibrate in anti-phase along the X axis. If the tuning fork rotates about the Z' axis, parallel to the Z axis, the Coriolis effect acts to push the tines into the Y axis, one tine being pushed in the positive Y direction, and the other in the negative Y direction. This gives rise to a torque tending to twist the tuning fork about the Z axis. As the tines 2 and 3 vibrate about their mean position the direction of the Coriolis torque changes direction. Consequently the tuning fork undergoes torsional oscillation about the Z axis. The magnitude of the torsional oscillation is proportional to the rate of rotation of the tuning fork 1 about the Z' axis. A comparison of the phase of the torsional oscillation of the tuning fork 1 with the phase of vibration of the tines 2 and 3 allows the direction of the rotation about Z' to be determined. The vibrational frequency of the tines may be matched with the natural frequency of a resonant system comprising the tuning fork and its support such that the torsional oscillation of the tuning fork 1 is magnified by the quality factor Q of the resonant system.

Figure 3:
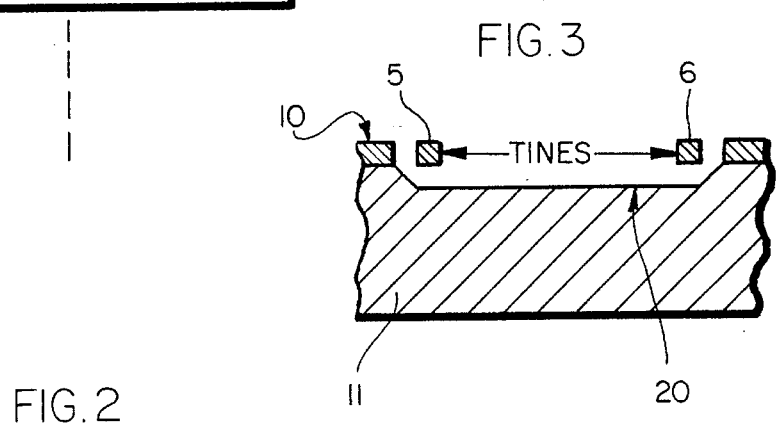
FIG. 3 is a cross-sectional view along the line 3—3 shown in FIG. 2.
Figure 2:
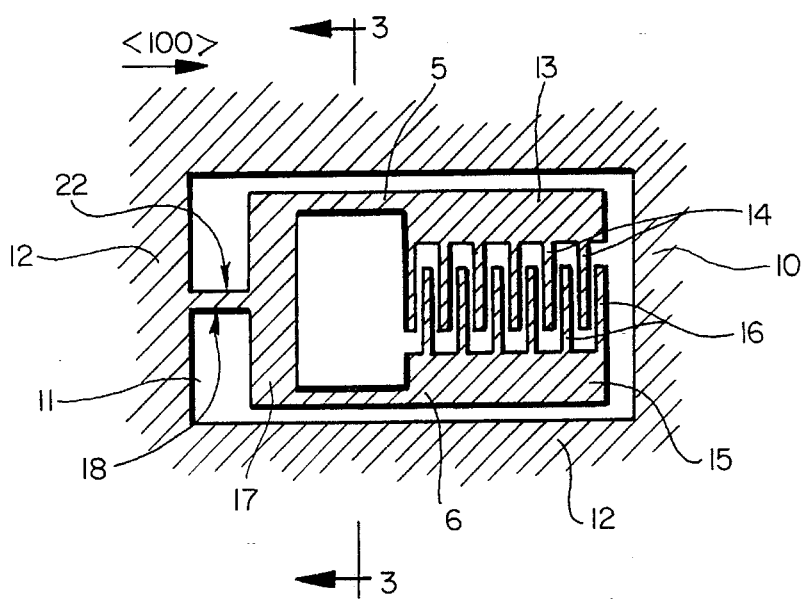
FIG. 2 is a schematic diagram of an angular rate sensor constituting a first embodiment of the invention.

FIG. 2 shows a plan view of an angular rate sensor. The angular rate sensor is formed in a thin layer of silicon 10 supported on a base 11. The base 11 is also of silicon. The thin layer of silicon is etched to define a surround 12, a first tine 5 comprising a first bar 13 having teeth 14, and a second tine 6 comprising a second bar 15 having teeth 16. The teeth 14 and 16 of the first and second tines 5 and 6 extend towards and are interdigitated with one another. The first and second bars 13 and 15 are joined together at a first end by a transverse element 17. The bars 13 and 15 and the transverse element 17 are connected to the surround 12 by a torsion support 18. The base 11 has a depression formed beneath the tines 5 and 6, as shown in FIG. 3.

A piezo-resistor 22 is formed on the torsion support 18 for detecting torsional deformation of the support 18. The piezo-resistor is orientated at 45 degrees to the direction of the bars. The silicon layer 10 is orientated such that the bars 13 and 15 are formed parallel with a <100> crystallographic axis. This ensures that the piezo-resistor 22 is parallel to the direction of maximum stress and orientated along the axis in which the piezo-resistive coefficient is at a maximum.

The silicon layer 10 is p doped in the regions of the bars 13 and 15 and the teeth 14 and 16. The doping allows electrical potentials to be applied to the tines 5 and 6 to cause them to be attracted to or repelled from one another.

Figure 4:
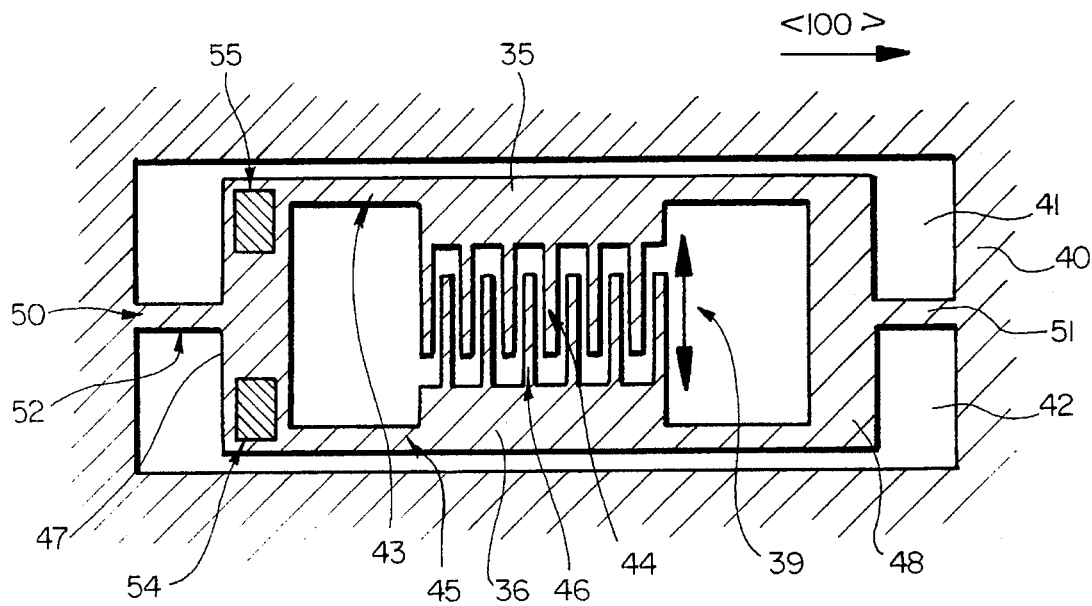
FIG. 4 is a schematic diagram of an angular rate sensor constituting a second embodiment of the invention.

FIG. 4 shows a second angular rate sensor which is similar to the first sensor. Two "C" shaped apertures 41 and 42 are formed in a thin layer of silicon 40. The silicon layer 40 is supported on a base of silicon. First and second tines 35 and 36 comprising bars 43 and 45 having interdigitated teeth 44 and 46, respectively, are formed within a region bordered by the apertures 41 and 42. There is a depression in the base 39 beneath the region bordered by the apertures 41 and 42. The bars 43 and 45 are joined together at a first end by a first transverse member 47 and at a second end by a second transverse member 48. The first transverse member 47 is connected to the silicon layer 40 outside of the region bounded by the apertures 41 and 42 by a first torsion support 50. The second transverse member 48 is connected to the silicon layer outside of the region bounded by the apertures 41 and 42 by a second torsion support 51. Thus the tines do not have a free end as in the first embodiment. The silicon in the bars 43 and 45 and the teeth 44 and 46 is doped so as to allow drive potentials to be applied to vibrate the tines. A transducer 52, such as a piezo-resistor, is formed on the torsion support 50. As in the first sensor, the bars are formed parallel with a <100> crystallographic axis and the piezo-resistor 52 is formed at 45° to the torsion stem 50 to maximise sensitivity.

Alternatively, a capacitive sensor may be provided, for instance in the form of a differential capacitor having first and second plates 54, 55 formed by doping regions of the member 47 and a third electrode formed by doping the adjacent silicon base.

Figure 5:
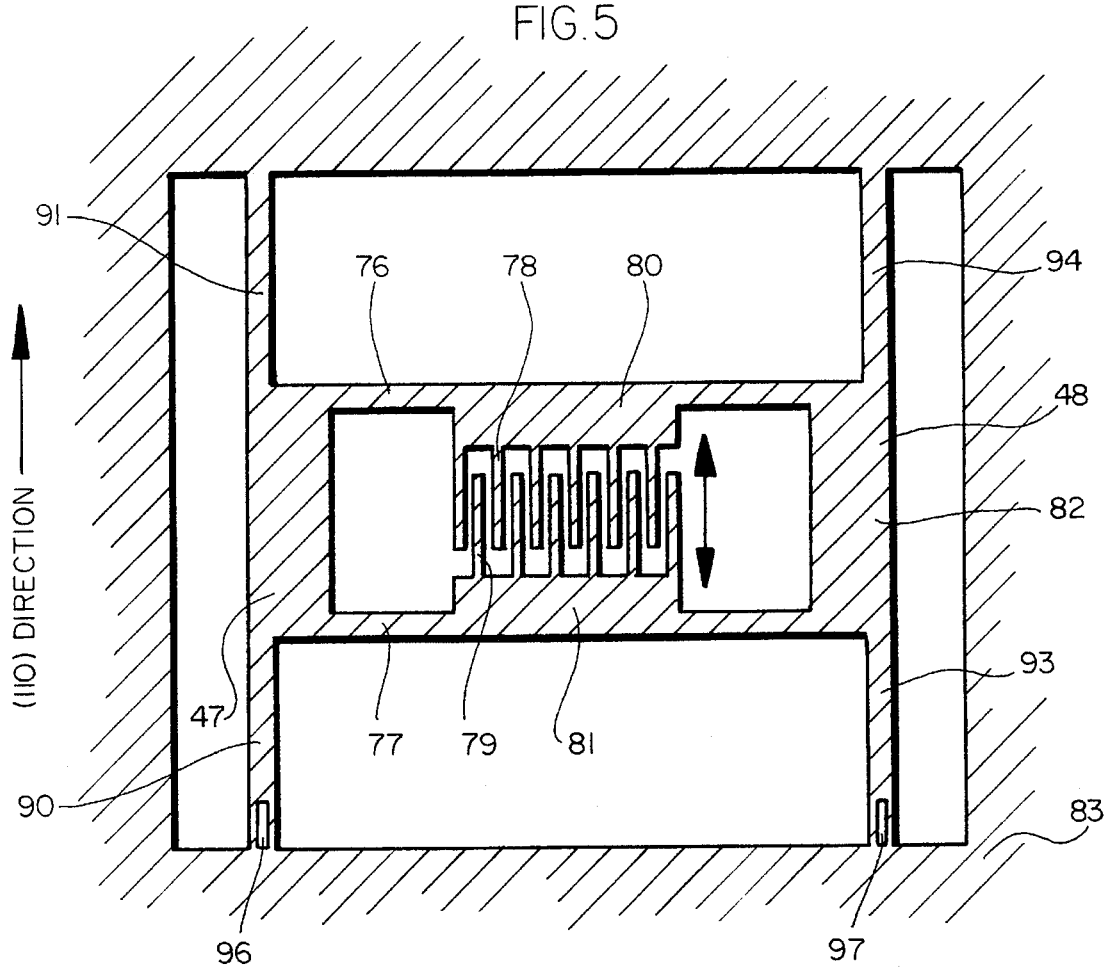
FIG. 5 is a schematic diagram of an angular rate sensor constituting a third embodiment of the invention.

FIG. 5 shows a third angular rate sensor. First and second tines 80 and 81 comprising first and second bars 76 and 77 and teeth 78 and 79, respectively, are formed in a generally "H" shaped region of silicon 82. The construction is similar to the sensor shown in FIG. 4. The first torsion support is replaced by first and second flexure supports 90 and 91, running perpendicular to the bars, connecting the first transverse member 47 to a border of silicon 83. Similarly the second torsion support is replaced by third and fourth flexure supports 93 and 94, respectively, connecting the second transverse member 48 to the silicon border 83. The bars 76 and 77 and the respective teeth 78 and 79 are doped to provide conducting paths which are used to supply a drive voltage to the tines. The connections for driving the tines have been omitted for clarity. The drive voltage may be applied to the tines via the flexure supports. For example the second and fourth supports 91 and 94 may be doped to provide conduction paths between the first and second tines 80 and 81 and first and second electrodes (not shown) formed in the border region 83. Alternatively, the driving voltage may be supplied to the tines 80 and 81 by capacitive coupling. Piezo-resistors 96 and 97 are formed on the first and third flexure supports for detecting flexure of the supports as a result of the Coriolis effect. To obtain enhanced sensitivity, the flexure supports are formed parallel to a <110> crystallographic plane and the piezo-resistors are placed longitudinally on the flexure supports.

Each of the embodiments described hereinabove uses monocrystalline silicon. Monocrystalline silicon allows resonant structures to be formed having an enhanced Q compared with structures of polycrystalline silicon. However, as an alternative, embodiments may be made of polycrystalline silicon. Furthermore the vibration of the tines coplanar with the layer of silicon 10,40 and 83 results in reduced air damping compared to vibration perpendicular to the plane of the silicon. Air damping may be further reduced by forming a substantially evacuated region around the tines, for example, by bonding a cover having a recessed region to the sensor, the recess being adjacent the tines so as to form an enclosure around the tines. The enclosure may then be substantially evacuated.

In each of the embodiments, rotation about an axis parallel to the bars, while the tines are vibrating, will result in an oscillation of the tines about the plane of the silicon layer. The oscillations of the tines result in oscillatory torsional deformation of the torsion supports in the first and second embodiments, and oscillatory flexure of the flexure supports in the third embodiment. The oscillations occur at the same frequency as the co-planar vibration frequency of the tines. Resonance within the sensor may be exploited to increase the amplitude of the oscillations. The amplitude of the oscillations is proportional to the rate of rotation of the sensor about the axis parallel with the tines. Comparison of the phase of the oscillation with the phase of vibration of the tines allows the sense of rotation to be determined.

The piezo-resistors may be replaced by capacitive sensors as described above.

A method of making the sensors will be described with reference to FIGS. 6a to 6e. A first silicon wafer 100 is etched to define a pit 102 in an upper surface of the wafer 100.

A second lightly p-doped wafer 105 has an epitaxial layer of n-doped silicon 106 formed on a lower surface of the wafer 105. The layer 106 is approximately 10 micrometers thick. The first and second layers 100 and 105 are silicon fusion bonded together with the epitaxial layer 106 facing the first wafer 100.

Figure 6A:
FIGS. 6a to 6e illustrate the process steps during the manufacture of the angular rate sensors constituting embodiments of the present invention.
Figure 6B:
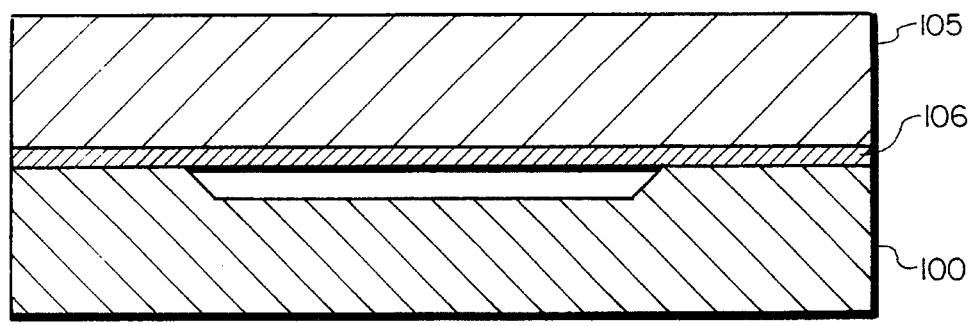
Figure 6C:
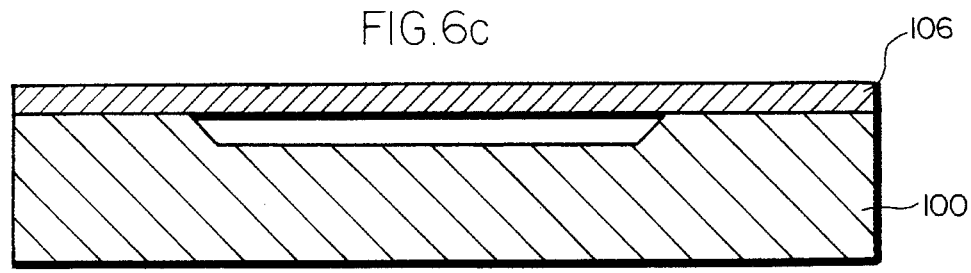
Figure 6D:
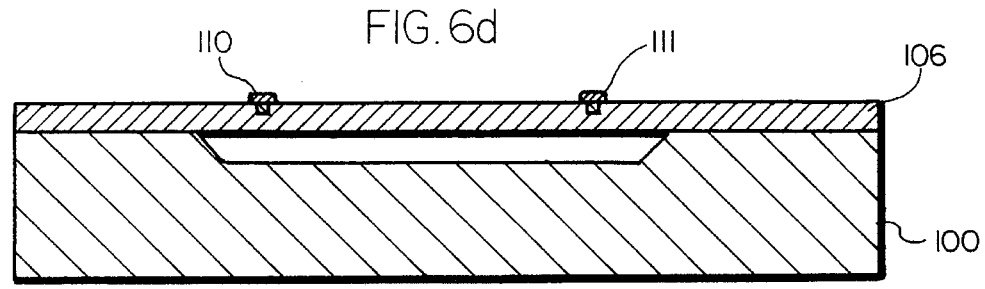

The second wafer 105 is etched away to expose the epitaxial layer 106 bonded to the first wafer 100, as shown in FIG. 6c.

The layer 106 is p doped in regions 111 that will form the bars and teeth of the sensors. Metallisation 110 to form conductive paths for the transducers such as piezo-resistors, and the transducers themselves are formed in the layer 106 using standard lithographic techniques well known to the man skilled in integrated circuit fabrication.

Figure 6E:
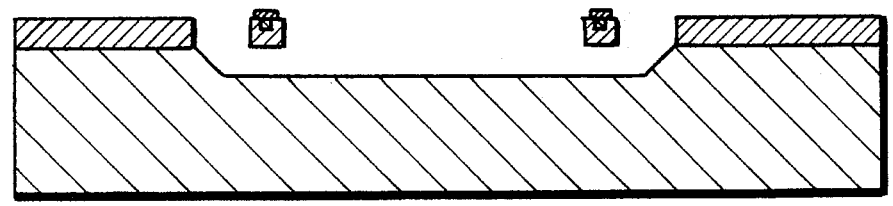

The layer 106 is then etched, for example by reactive ion etching, to define the mechanical structure of the sensor, as shown in FIG. 6e. Thus the tines are formed suspended over the depression 102 in the first layer 100.

It is thus possible to use established fabrication techniques to form inexpensive angular rate sensors. The sensors benefit from the use of monocrystalline silicon which has improved piezo-resistive coefficients and a greater mechanical Q factor compared to polycrystalline silicon. Furthermore the tines of the sensors are driven in co-planar vibration which results in reduced viscous drag and damping compared to prior art vibration perpendicular to the plane of the sensor. Further, because both sets of tines twist in anti-phase but remain substantially aligned, the tines are always subjected to a substantially constant maximum drive force irrespective of rotation. Thus, the sensitivity of the sensor is substantially unaffected by rotation.

We claim:

1. An angular rate sensor comprising: a wafer of silicon etched to define a surround, a first support extending from said surround, a first transverse member supported by said first support, and first and second substantially parallel tines having first and second sets, respectively, of teeth which are interdigitated with each other, said tines extending from and rigidly supported by said first transverse member; means for exciting said first and second tines into co-planar oscillation in anti-phase with each other, the oscillation being co-planar with said wafer in the absence of rotation; and detecting means for detecting rotation of said first and second tines out of a plane of said wafer by detecting one of relative movement and relative force between said first transverse member and said surround.

2. A sensor as claimed in claim 1, in which said exciting means comprises electrostatic exciting means.

3. A sensor as claimed in claim 1, in which said detecting means comprises at least one piezo-resistor.

4. A sensor as claimed in claim 1, in which said detecting means comprises a capacitive transducer.

5. A sensor as claimed in claim 1, in which said wafer comprises monocrystalline silicon.

6. A sensor as claimed in claim 1, wherein said first support is a flexure support that extends perpendicular to said first and second tines and co-planar with said wafer.

7. A sensor as claimed in claim 6, in which said first and second tines have ends remote from said first transverse member and said wafer is etched to define a second transverse member from which said tines extend as said ends, said sensor further comprising a plurality of additional supports etched in said wafer, wherein said plurality of additional supports are flexure supports that extend perpendicular to said first and second tines and co-planar with said wafer, each of said plurality of additional flexure supports supporting one of said first and second transverse members from said surround.

8. A sensor as claimed in claim 7, in which said detecting means comprises means, disposed on at least one of said flexture supports, for detecting flexure perpendicular to said wafer.

9. A sensor as claimed in claim 1, wherein said first support is torsion support supporting said first transverse member from said surround and extending parallel to longitudinal axes of said first and second tines.

10. A sensor as claimed in claim 9, in which said first torsion support is equidistant from said first and second tines.

11. A sensor as claimed in claim 9, in which said detecting means comprises torsional deformation measuring means disposed on said first torsion support.

12. A sensor as claimed in claim 9, in which said first and second tines have ends remote from said first transverse member and said wafer is etched to define a second transverse member from which said tines extend at said ends, said sensor further comprising a second torsion support supporting said second transverse member from said surround and being coaxial with said first torsion support.

13. A sensor as claimed in claim 12, in which said detecting means comprises torsional deformation measuring means disposed on said second torsion support.

\* \* \* \* \*